Jan. 9, 1940.  A. PINDEK  2,186,809

LOCKING SLIDE FOR FASTENING DEVICES

Filed Feb. 26, 1936

INVENTOR.
Abraham Pindek
BY
ATTORNEYS.

Patented Jan. 9, 1940

2,186,809

UNITED STATES PATENT OFFICE 2,186,809

LOCKING SLIDE FOR FASTENING DEVICES

Abraham Pindek, Brooklyn, N. Y.

Application February 26, 1936, Serial No. 65,757

6 Claims. (Cl. 24—205)

The invention relates to slide operated fasteners. It has for its object to provide a device having a number of improved features over the devices now in use. One of its main objects is to provide a device in which the members secured together are placed parallel, or at an angle, to one another instead of on the same plane as is now the case. Another object is to so construct the device that the customary "slide" may be manipulated from either one side or the other or from both sides. A further object is to provide means for locking the "slide" in any position so as to prevent accidental opening of the fastening device. A still further object is to provide means which will prevent the opening of the fastening device when a pull is exerted on the members which the device fastens together.

Additional objects are to provide a fastening device which, when required, may be made of very small size, which is less exposed to view and which can be manufactured and attached to the articles on which used at a low cost.

These and various other objects and advantages will be readily understood from the following description and from the accompanying drawing of preferred embodiments of the invention, in which, however, modifications may be made without departing from the scope of the appended claims. In the drawing Fig. 1 is a plan view of the fastening device;

Fig. 2 a side view;

Fig. 3 a view showing the other side of Fig. 1 and shown with the fabrics folded sidewardly;

Figure 1:
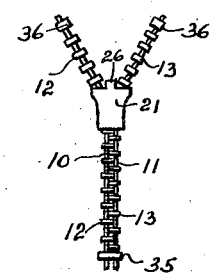
Figure 2:
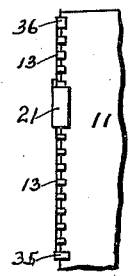

Referring now to all the views, simultaneously, the pieces of fabric on which the fastener is used is shown at 10 and 11. The fastening device itself consists of a plurality of interlocking members 12 and 13, each of which is provided with an indentation 14 and a protrusion 15. The protrusion 15 fits into the indentation of the adjacent member so as to interlock the members in the manner of the well-known slide operated fastener. However, these members instead of having the means for securing them to the fabric at the end of the member, or in line with the axis of the member, have the securing means on one side, as plainly shown at 16 in Fig. 11. These securing means consist preferably of a substantial circular opening 17 into which a slot 18 opens.

Figure 9:
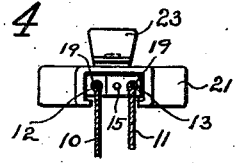
Fig. 9 is an end view of Fig. 8.
Figures 7, 10:
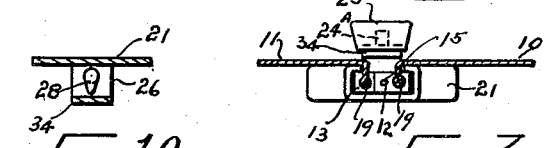
Fig. 7 is an end view of Fig. 6.
Fig. 10 is a view taken on line 10—10, of Fig. 4, and showing the locking mechanism with the detent turned ninety degrees.

The fabric, which is generally formed with a corded edge 19, as plainly shown in Figs. 7 and 9, is inserted with the corded edge in the circular opening. After the fabric is inserted, the end 20 of the member is pressed against the member proper so as to clamp the fabric. While a corded edge has been shown, it is, of course, evident that a seamed or folded edge may be used.

Figure 4:
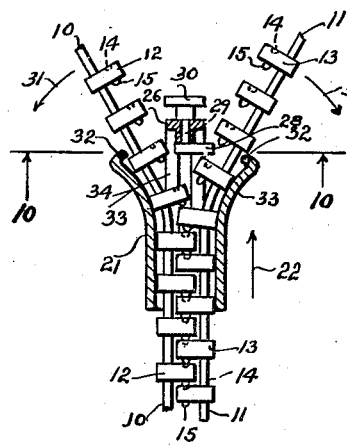
Fig. 4 is an enlarged cross-sectional plan view showing various details of the device.
Figures 8, 11:
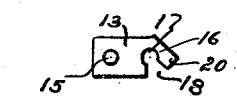
Fig. 8 is a front view of the slide shown slightly modified.
Fig. 11 is an enlarged view of one of the fastening members shown prior to its attachment to the fabric.

The slide 21 operates in the usual manner so that when it is pushed in the direction indicated by the arrow 22 in Fig. 4, the interlocking members are forced in between one another so as to lock the projections in the indentations. When the slide is pulled in the opposite direction, the locking members are separated. A finger grip, such as shown at 23 in Fig. 8, is generally employed with the slide to facilitate its manipulation. In such cases I prefer to shear out a rail 24 from the face of the slide and to mount the finger grip thereon by means of a slot 25 formed in the finger grip. This finger grip may be moved from the top to the bottom of the slide, in the usual manner, when the fasteners are being closed or opened.

Figure 5:
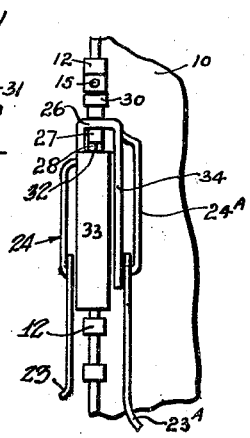
Fig. 5 is a side view of Fig. 4, shown with one of the fabric members removed.

To prevent the accidental opening of the slide, a lock is provided which comprises a member 26 bent over the top of the slide. As shown in Figs. 4 and 5, a bearing 27 is formed on this member. A locking detent 28 is mounted on the end of a stud or shaft 29 formed on the handle member 30 and this stud or shaft rotates in the bearing 27. The detent is shaped as plainly shown in Figs. 4, 5 and 10. When the slide has been pulled up to the desired distance, or completely to the top as the case may be, the handle 30 is turned until the detent 28 is interposed between two of the interlocking members on either of the fabrics, as plainly shown in Fig. 4.

It is evident that with this detent in the locked position, as shown in Fig. 4, the slide cannot be moved upward or downward. When it is desired to move the slide, the handle is turned until the detent assumes the position shown in Fig. 10, or at right angles to the front face of the slide. In this position the detent will pass freely down between the interlocking members as they open. Stops may, of course, be provided on the handle or on the detent to limit the movement.

In the slide operated fasteners now in use, it is possible to move the slide downward by pulling on the fabrics in the directions indicated by the arrows 31. This is objectionable, particularly where the slide operated fasteners are used on any articles exposed to the wind, as it often causes the unintentional opening of the fasteners. To overcome this, inwardly extending hooks 32 are provided on the sides 33 of the slide. These hooks are plainly illustrated in Fig. 4. It is evident that any movement of the fabrics in the direction of the arrows will cause the interlocking members of the fabrics to engage against these hooks and thus prevent the slide from moving.

Figure 3:
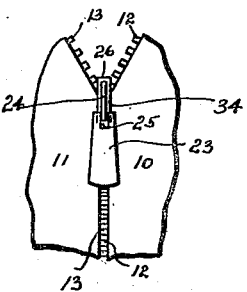
Figure 6:
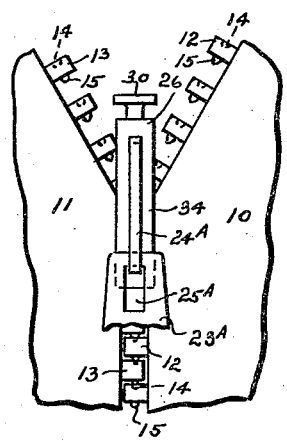
Fig. 6 is a view showing the other side of Fig. 4 and shown with the fabric folded sidewardly.

The embodiments shown in Figs. 1, 2, 4 and 10 illustrate the use of the device, as for example employed upon a satchel or similar article in which it is advantageous to place the fabric members parallel to each other, as in Fig. 4. In such cases the finger grip 23, when employed, is placed on the front face of the slide. There are many cases, however, where it may be required that the fabrics extend sidewardly as shown in Figs. 3, 6 and 7. In such cases, an arm 34 is extended downwardly from the member 26 and on this arm the rail 24A, on which the finger grip 23A is mounted, is formed. Thus when the fabrics 10 and 11 are bent sidewardly, as shown, the fastening device as well as the slide proper, are on the rear of the material, only a very small portion of the fasteners being shown. The arm 34 and the finger grip 23A are the only parts of the slide shown on the outer or front part of the fabrics.

This feature is particularly advantageous in cases where it is desired to make the device as inconspicuous as possible. It has also another great advantage, in that, in this construction, the slide may be operated from both sides of the fabric, as for example if used on a tent flap. In such cases, when the slide is operated both from the inside and the outside of the tent, it is advantageous to place a finger grip both on the slide proper and on the arm 34, as in Fig. 5.

The ordinary stops 35 and 36 are used at each end of the device. The stop 35 secures the fabrics together and prevents downward displacement of the slide and the upper stops 36, by being aligned with each other, prevent upward displacement of the slide.

From the foregoing it will be seen that the present invention has many advantages over the fasteners now on the market. Principally among these may be mentioned that the interlocking members may be placed directly on the articles without an intervening tape, as is now the case and with the materials of the article parallel to each other. The slide may be locked in any position and operating from either one side or the other. Accidental opening of the fastener is prevented and less of the fastening device itself is exposed to view.

Having described the invention and its objects, what I claim as new and wish to protect by Letters Patent is:

1. A slide, for slide-operated fasteners, having a member extending over the top of the slide and adapted to pass between the interlocking members of the fastener as the slide is moved in one direction or the other; a bearing formed on said member; a shaft rotatingly mounted in said bearing axially with the slide; a handle member secured to the upper end of said shaft; a detent secured to the lower end of the shaft and which, when turned transversely to the interlocking members of the fastener, will engage with one of these interlocking members and prevent the opening of the fastener; and a finger grip secured to the front face of the slide for operating same.

2. A slide, for slide-operated fasteners, having a member extending over the top of and down over the rear face of the slide with the top of the member adapted to pass between the interlocking members of the fastener as the slide is moved in one direction or the other; a bearing formed on the top part of said member; a shaft rotatingly mounted in said bearing axially with the slide; a handle member secured to the upper end of said shaft; a detent secured to the lower end of the shaft and which, when turned transversely to the interlocking members of the fastener, will engage with one of these interlocking members and prevent the opening of the fastener; a finger grip secured to the front face of the slide for operating same; and another finger grip slidingly mounted on the downwardly-extending member on the rear face.

3. A slide, for slide operated fasteners, of the class described; a bearing formed in the top thereof; a shaft rotatingly mounted in said bearing axially with the slide; a handle member secured to the upper end of said shaft; a detent secured to the lower end of the shaft and which, when turned transversely to the interlocking members of the fastener, will engage with one of these interlocking members and prevent the opening of the fastener, and a finger grip secured to the front face of the slide for operating the same.

4. In a slide for slide-operated fasteners of the class described; a bearing formed in the top thereof; a shaft mounted in said bearing axially with the slide; a detent secured to the lower end of said shaft; a handle member secured to the upper end of said shaft for interposing said detent into engagement with one of said interlocking members to prevent the opening of the fastener; and a finger grip secured to the front face of the slide for operating the same.

5. In a slide for slide operated fasteners of the class described; a bearing formed in the top thereof; a shaft mounted in said bearing axially with the slide and having a detent secured to the lower end thereof for interposition between, and engagement with, the interlocking members to prevent movement of the slide; means for interposing said detent into locking engagement with the fastener members; and a finger grip secured to the slide for operating the same.

6. A slide for slide operated fasteners comprising a flat piece of stamping metal having its edges turned to form opposite guide and wedging elements, one face of the slide having an extension which is turned over the top of the slide and down over the opposite face of the slide, said opposite face of the slide being formed by continuations of said elements, said extension having a part bent out away from said last-mentioned face and extending down parallel with said extension to provide a longitudinal slot, a finger grip mounted to slide in said slot and another longitudinal member mounted on the other face of said slide and extending down in parallel with the face of said slide to provide a longitudinal slot on said face, and a second finger grip mounted for sliding in said slot.

ABRAHAM PINDEK.